United States Patent
Hamilton et al.

(10) Patent No.: US 8,000,857 B2
(45) Date of Patent: Aug. 16, 2011

(54) VEHICLE PRESENCE INDICATION

(75) Inventors: William E. Hamilton, Rochester, MI (US); Carroll C. Kellum, Kelkheim-Ruppertshain (DE)

(73) Assignee: GM Global Technology Operations LLC, Detroit, MI (US)

( * ) Notice: Subject to any disclaimer, the term of this patent is extended or adjusted under 35 U.S.C. 154(b) by 1332 days.

(21) Appl. No.: 11/341,283

(22) Filed: Jan. 27, 2006

(65) Prior Publication Data

US 2007/0179701 A1 Aug. 2, 2007

(51) Int. Cl.
*B60Q 1/26* (2006.01)
*B60Q 1/46* (2006.01)

(52) U.S. Cl. .......... 701/36; 701/300; 340/468; 340/471; 340/474

(58) Field of Classification Search .................. 455/345, 455/456.1, 456.2, 456.6; 701/200, 205, 207, 701/36, 117–119, 300–302; 340/458, 468, 340/471, 472, 474
See application file for complete search history.

(56) References Cited

U.S. PATENT DOCUMENTS

| | | | | |
|---|---|---|---|---|
| 5,875,183 A * | 2/1999 | Nitadori | ........................ | 370/328 |
| 6,127,947 A | 10/2000 | Uchida et al. | ................. | 340/999 |
| 6,148,212 A | 11/2000 | Park et al. | ..................... | 455/456 |
| 6,222,462 B1 * | 4/2001 | Hahn | ............................ | 340/904 |
| 7,005,977 B1 * | 2/2006 | Tengler et al. | ............. | 340/457.2 |
| 2004/0116106 A1 * | 6/2004 | Shishido et al. | ........... | 455/414.2 |
| 2005/0002347 A1 | 1/2005 | Lee et al. | ...................... | 370/312 |
| 2005/0137786 A1 * | 6/2005 | Breed et al. | ................... | 701/200 |

FOREIGN PATENT DOCUMENTS

| | | |
|---|---|---|
| CN | 2094482 U | 1/1992 |
| CN | 1534553 A | 10/2004 |

* cited by examiner

*Primary Examiner* — Khoi Tran
*Assistant Examiner* — Spencer Patton
(74) *Attorney, Agent, or Firm* — Cantor Colburn LLP

(57) ABSTRACT

A method, system, and computer program product for vehicle presence indication. The method includes receiving a request including an announcement type at a first vehicle. The receiving is from a second vehicle via a mobile ad-hoc network that includes the first vehicle and the second vehicle. The announcement type is initiated at the first vehicle in response to receiving the request.

14 Claims, 2 Drawing Sheets

VEHICLE PRESENCE INDICATION

BACKGROUND OF THE INVENTION

The present disclosure relates generally to vehicle presence indication, and more particularly, to utilizing an ad-hoc network to request a first vehicle to announce its presence to the occupants of a second vehicle.

Mobile ad-hoc networks include a collection of mobile nodes that form an ad-hoc network without the assistance of centralized structures. An ad-hoc network may be formed when a number of wireless communication devices join together to form a network. Terminals in ad-hoc networks can operate as hosts and/or routers. Thus, an ad-hoc network may be easily reconfigured to meet existing traffic demands in an efficient fashion. Moreover, ad-hoc networks do not require the infrastructure required by conventional access networks, making ad-hoc networks an attractive choice for the future.

An increasing number of vehicles are becoming equipped with telematics systems which may be used for a number of purposes, including collecting road tolls, tracking fleet vehicle locations, recovering stolen vehicles, providing automatic collision notification and providing wireless communication between vehicles. In many cases, the telematics systems include wireless communication devices which allow the vehicles to participate in and form mobile ad-hoc networks. As more vehicles are equipped with wireless communication devices capable of participating in mobile ad-hoc networks it would be desirable to use the wireless communication devices to provide communication between two or more vehicles. Additionally, it would be desirable to utilize the mobile ad-hoc networks to request that one vehicle announces its presence to the driver of another vehicle.

BRIEF DESCRIPTION OF THE INVENTION

According to one aspect of the invention, a method is provided for vehicle presence indication. The method includes receiving a request including an announcement type at a first vehicle. The receiving is from a second vehicle via a mobile ad-hoc network, which includes the first vehicle and the second vehicle. The announcement type is initiated at the first vehicle in response to receiving the request.

In another aspect of the invention, a system is provided for vehicle presence indication. The system includes a telematics unit and a processor in communication with the telematics unit. The telematics unit is in communication with a mobile ad-hoc network, which includes a first vehicle and a second vehicle. The processor includes instructions for facilitating receiving a request including an announcement type at the first vehicle. The receiving is from the second vehicle via the mobile ad-hoc network. The processor also includes instructions for initiating the announcement type at the first vehicle in response to receiving the request.

In a further aspect of the invention, a computer program product is provided for vehicle presence indication. The computer program product includes a storage medium readable by a processing circuit and storing instructions for execution by the processing circuit for performing a method. The method includes receiving a request including an announcement type at a first vehicle. The receiving is from a second vehicle via a mobile ad-hoc network, which includes the first vehicle and the second vehicle. The announcement type is initiated at the first vehicle in response to receiving the request.

BRIEF DESCRIPTION OF THE DRAWINGS

Referring now to the figures, which are meant to be exemplary embodiments, and wherein the like elements are numbered alike.

DETAILED DESCRIPTION OF THE INVENTION

Exemplary embodiments of the present invention may be utilized to allow the display of information at a vehicle about other mobile ad-hoc network equipped vehicles and roadway hazards by causing them to display lights or make an audible sound (e.g., honk horn) when requested by another vehicle equipped with a mobile ad-hoc network. For example, a vehicle signaling to make a left turn at an intersection could request that oncoming vehicles flash their headlights. In another example, a vehicle approaching a crossroad could request that vehicles on the crossroad flash their marker lights. In addition, temporary hazard markers could be equipped with transponders which would on receipt of a signal from an equipped vehicle cause a strobe to flash.

Figure 1:
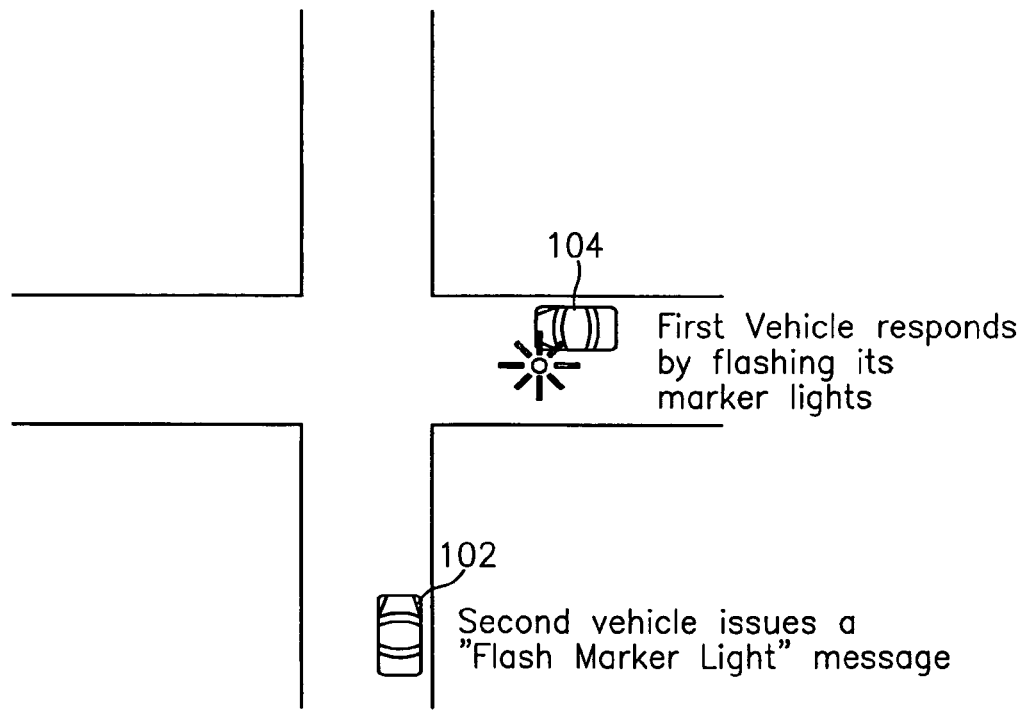
FIG. 1 is an illustration of a scenario where exemplary embodiments of the present invention may be utilized to provide vehicle presence indication.

Exemplary embodiments of the present invention include utilizing mobile ad-hoc networks to transmit messages that request other vehicles and/or transponder-equipped traffic devices (e.g., temporary construction barriers, traffic lights, and warning signs) to announce their presence. For example, as depicted in FIG. 1, one or both vehicles can issue a message requesting the other vehicle to flash its marker lights. FIG. 1 is an illustration of a scenario where exemplary embodiments of the present invention may be utilized to provide vehicle presence indication. FIG. 1 depicts a first vehicle 104 and a second vehicle 102 approaching an intersection. The second vehicle 102 issues a request that includes an announcement type of "flash driver side front marker light."

The request may be transmitted in a broadcast mode to all vehicles within the mobile ad-hoc network range of the second vehicle. Alternatively, the request may also be transmitted to a specific vehicle (e.g., the first vehicle 104) when the telematics unit on the second vehicle 102 is aware of the presence of the first vehicle 104. The request may include other information (besides announcement type) such as a geographic cell (e.g., longitude/latitude) from which a response is desired, a vehicle heading direction from which a response is desired and/or a vehicle speed range from which a response is desired. The vehicles that receive the request initiate the announcement type specified by the request only if the receiving vehicle fits the criteria (e.g., the geographic cell criteria, the vehicle heading angle range criteria and the vehicle speed range criteria) in the request. For example, only vehicles within the specified geographic cell will respond by initiating the requested announcement type (e.g., flash marker lights). In this manner, only vehicles that are likely to become coincident with the requesting vehicle will respond by announcing their presence. The request may include other criteria such as, but not limited to: on-coming vehicles, and vehicles on a coincident path (e.g., estimated to be at a crossroad at roughly the same time). When a criteria is specified, the receiving vehicles only announce their presence if they meet the specified criteria.

When the first vehicle 104 receives the request for an announcement type of "flash marker lights" from the second vehicle 102, the first vehicle 104 initiates the flashing of its marker lights. In exemplary embodiments, the presence indication application/functions must be activated in the first vehicle 104 in order for the first vehicle 104 to respond to the request from the second vehicle 102. The presence indication application may be activated automatically in the first vehicle 104 in response to detected driving conditions, for example, in response to low visibility conditions or if the vehicle is traveling on a country road. Other detected conditions that may lead to the first vehicle 104 activating the presence indication application include, but are not limited to: low light, rainy conditions, and a temperature/humidity level that is conducive to fog formation. Alternatively, the presence indication application may be always activated when the vehicle is being driven. Another option is for the operator of the first vehicle 104 to manually activate and deactivate the presence indication application. The manual activation by the operator may be in response to vehicle messages suggesting to the vehicle operator that the presence indication application could be useful (e.g., in poor visibility conditions).

Similarly, the presence indication application must be activated in the second vehicle 102 in order for the second vehicle to transmit the request. The activation may be activated automatically in the second vehicle 102 in response to detected driving conditions, for example, in response to low visibility conditions or if the vehicle is traveling in a highly congested area. Other detected conditions that may lead to the first vehicle 104 activating the presence indication application include, but are not limited to: low light, rainy conditions, and a temperature/humidity level that is conducive to fog formation. Alternatively, the presence indication application may be always activated when the vehicle is being driven. Another option is for the operator of the second vehicle 102 to manually activate and deactivate the presence indication application. The manual activation by the operator may be in response to vehicle messages suggesting to the vehicle operator that the presence indication application could be useful (e.g., in poor visibility conditions).

In exemplary embodiments, when the request (i.e., message) is broadcast, it may include, but is not limited to: announcement type (i.e., response) desired, vehicle network address (e.g., vehicle IP address), vehicle position, vehicle heading, and vehicle speed. Optionally, the broadcast request may include geographic cell (e.g., longitude/latitude) from which a response is desired, vehicle heading angle range from which a response is desired, and vehicle speed range from which a response is desired.

In exemplary embodiments, when the request is sent to a specific vehicle (e.g., vehicle-to-vehicle message) it may include, but is not limited to: announcement type desired, vehicle network address, vehicle position, vehicle heading, and vehicle speed.

The announcement type may include an audible warning (e.g., honking a horn) and/or a visual warning (e.g., flashing marker lights, flashing headlights). The announcement type may also include a coordinate acknowledgement so that the second vehicle 102 can determine the geographic position of the first vehicle 104. When the coordinate acknowledgement type of request is initiated by the first vehicle 104, the geographic location (e.g, global positioning system coordinates) of the first vehicle 104 is transmitted to the second vehicle 102. Optionally, the first vehicle 104 may also send its heading and speed to the second vehicle 102 in response to the coordinate acknowledgement type of request.

Figure 2:
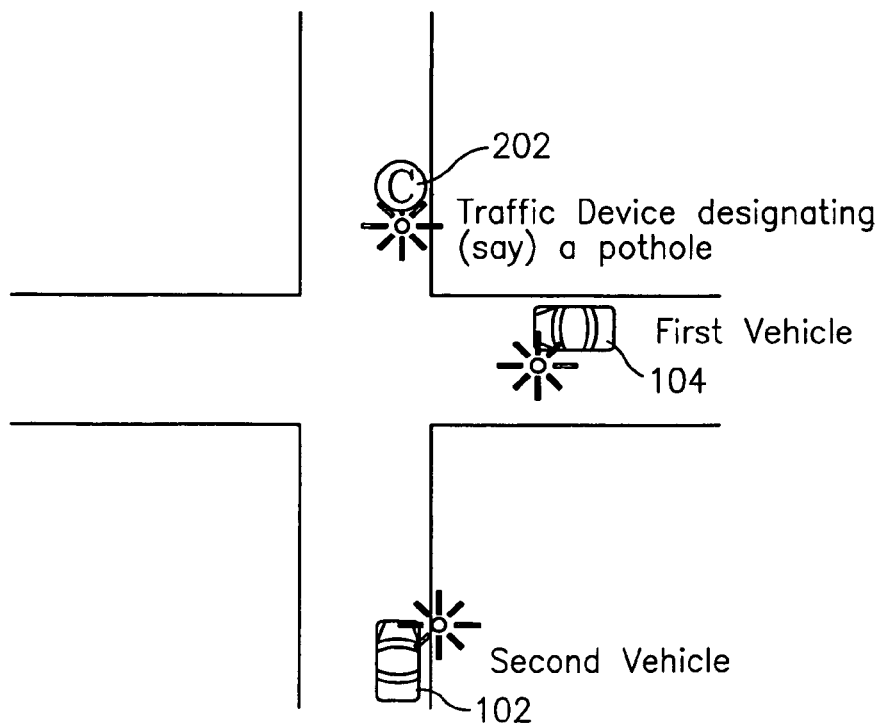
FIG. 2 is an illustration of a scenario where exemplary embodiments of the present invention may be utilized to provide vehicle and traffic device presence indication.

FIG. 2 is an illustration of a scenario where exemplary embodiments of the present invention may be utilized to provide vehicle and traffic device presence indication. FIG. 2 depicts the second vehicle 102 and the first vehicle 104 as well as a traffic device 202. In the scenario depicted in FIG. 2, the second vehicle 102 broadcasts a request for an announcement type (e.g., flash marker lights). The request is received by the first vehicle 104 and processed as described in reference to FIG. 1. Additionally, the request is received by the traffic device 202 depicted in FIG. 2. In exemplary embodiments, the traffic device 202 is equipped with a transponder and in response to receiving a request with an announcement type of "flash marker lights" it responds by flashing a strobe.

The traffic device 202 may be any stationary object along a roadway, including, but not limited to: a marker designating a pothole, a temporary traffic sign (e.g., construction ahead sign), a permanent traffic sign (e.g., sharp turn ahead sign), a traffic light, and a temporary construction barrier. The transponder may include instructions to respond to the request with the requested announcement type only when the traffic device 202 meets the response criteria (e.g., is within a specified latitude/longitude cell). The traffic device 202 may be capable of providing audio and/or visual announcements.

Figure 3:
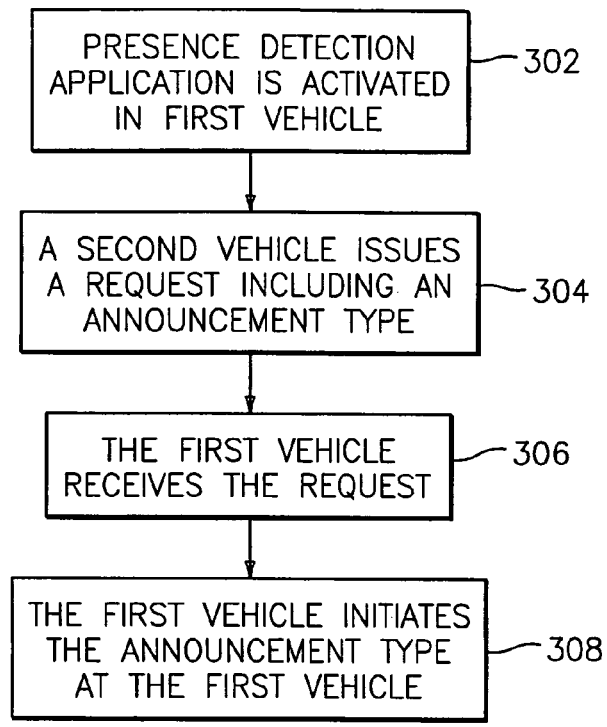
FIG. 3 is a process flow that may be implemented by exemplary embodiments of the present invention.

FIG. 3 is a process flow that may be implemented by exemplary embodiments of the present invention. At block 302, the presence indication application is activated in a first vehicle 104. At block 304, a second vehicle 102 issues a request that includes an announcement type. As discussed previously, the request may be issued as a broadcast message or as a message to a specific vehicle. At block 306, the first vehicle 104 receives the request. At block 308, the first vehicle 104 initiates the announcement type at the first vehicle 104. Alternatively, as discussed previously, in exemplary embodiments, the first vehicle 104 may only initiate the announcement type if it meets the response criteria (e.g., is within a specified geographic cell, is within a heading angle range, or is within a vehicle speed range).

Figure 4:
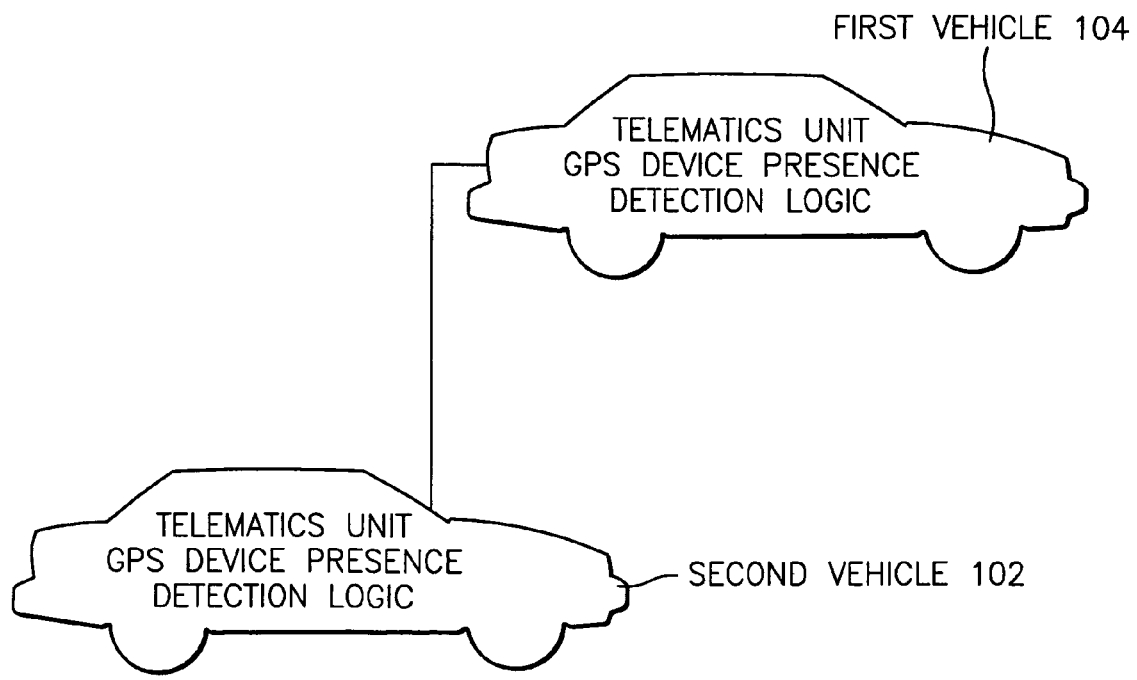
FIG. 4 is an illustration of a system that may be implemented by exemplary embodiments of the present invention.

FIG. 4 is an illustration of a system that may be implemented by exemplary embodiments of the present invention. The first vehicle 104 includes a telematics unit for communicating with an ad-hoc wireless network, a GPS device (or any other geographic location system for determining the geographic location of the first vehicle 104, and presence indication logic. The second vehicle 102 also includes a telematics unit, a GPS device and presence indication logic.

The presence indication logic may include just the functionality that transmits the requests that specify announcement types or it may include just the functionality that receives the request and initiates the announcement type. In exemplary embodiments, the presence indication logic includes both the request transmitting capability and the announcement type initiation capability. The presence indication logic (also referred to herein as the presence indication application) may be implemented in hardware and/or software and in exemplary embodiments is implemented by a processor that is located on the vehicle. The processor contains computer instructions (that may be implemented in hardware and/or software) for carrying out the presence indication functions described herein.

The communication between the vehicles may be provided by any wireless mobile ad-hoc network method known in the art, including, but not limited to, any IEEE 802.11 protocol or any dedicated short range communication (DSRC) device utilizing a single or multiple channel protocol with fixed or variable transmission power.

Exemplary embodiments may be utilized by vehicles "caravanning" to help the following driver(s) keep track of the lead vehicle(s). Additionally, exemplary embodiments may be. utilized to assist in rescue and stolen vehicle recovery situations. A law enforcement officer may broadcast a unique identifier associated with a stolen vehicle (e.g, the vehicle identification number) in the request. If the announcement type is audible the horn would honk in response to the request only on the vehicle containing the unique identifier. Law enforcement officers in the area may then be alerted to possible stolen vehicles.

Exemplary embodiments of the present invention may be utilized to enhance the visibility of equipped vehicles and construction markers. Additionally, exemplary embodiments of the present invention provide a natural presentation of warning information. Flashing lights and/or honking draw the driver's attention to the vehicle the system wants the driver to notice and draws the driver's attention outside of the vehicle in a natural intuitive format.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for vehicle presence indication, the method comprising:
   receiving a request including an announcement type at a first vehicle, the receiving from a second vehicle via a mobile ad-hoc network, which includes the first vehicle and the second vehicle; and
   initiating the announcement type at the first vehicle in response to receiving the request, the announcement type includes an audible warning, a visual warning or both that announce to the second vehicle the presence of the first vehicle, wherein the initiating is performed only if the first vehicle meets one or more of a geographical cell criteria, a vehicle heading angle range criteria, and a vehicle speed range criteria.

2. The method of claim 1 wherein the request further includes a network address of the second vehicle, a geographic location of the second vehicle, a heading of the second vehicle and a current speed of the second vehicle.

3. The method of claim 1 wherein the request from the second vehicle is transmitted as a broadcast message.

4. The method of claim 3 wherein the request further includes a unique vehicle identifier, wherein the initiating is performed only if the first vehicle corresponds to the unique vehicle identifier.

5. The method of claim 1 wherein the request from the second vehicle is transmitted specifically to the first vehicle.

6. The method of claim, 1 wherein the audible warning includes activation of a horn on the first vehicle.

7. The method of claim, 1 wherein the visual warning includes illumination or flashing of a headlight on the first vehicle.

8. The method of claim, 1 wherein the visual warning includes illumination or flashing of a marker light on the first vehicle.

9. The method of claim 1 wherein the announcement type includes a coordinate acknowledgement and the initiating includes transmitting a geographic location of the first vehicle from the first vehicle to the second vehicle.

10. The method of claim 9 wherein the initiating further includes transmitting a heading and a speed of the first vehicle from the first vehicle to the second vehicle.

11. A system for vehicle presence indication, the system comprising:
    a telematics unit in communication with a mobile ad-hoc network that includes a first vehicle and a second vehicle; and
    a processor in communication with the telematics unit, the processor including instructions for facilitating:
        receiving a request including an announcement type at the first vehicle, the receiving from the second vehicle via the mobile ad-hoc network; and
        initiating the announcement type at the first vehicle in response to receiving the request, the announcement type includes an audible warning, a visual warning or both that announce to the second vehicle the presence of the first vehicle, wherein the initiating is performed only if the first vehicle meets one or more of a geographical cell criteria, a vehicle heading angle range criteria, and a vehicle speed range criteria.

12. The system of claim 11 wherein the request further includes a network address of the second vehicle, a geographic location of the second vehicle, a heading of the second vehicle and a current speed of the second vehicle.

13. The system of claim 11 wherein the request from the second vehicle is transmitted as a broadcast message via the mobile ad-hoc network.

14. A computer program product for vehicle presence indication stored on a computer storage medium, the computer storage medium readable by a processing circuit and storing instructions for execution by the processing circuit for performing a method, the method comprising:
    receiving a request including an announcement type at a first vehicle, the receiving from a second vehicle via a mobile ad-hoc network that includes the first vehicle and the second vehicle; and initiating the announcement type at the first vehicle in response to receiving the request, the announcement type includes an audible warning, a visual warning or both that announce to the second vehicle the presence of the first vehicle, wherein the initiating is performed only if the first vehicle meets one or more of a geographical cell criteria, a vehicle heading angle range criteria, and a vehicle speed range criteria.

* * * * *